United States Patent
Ardaud et al.

(10) Patent No.: US 6,762,272 B1
(45) Date of Patent: Jul. 13, 2004

(54) COMPOSITIONS USEFUL FOR OBTAINING HIGH GLOSS COATINGS, METHODS OF USING SUCH COMPOSITIONS AND COATINGS THUS OBTAINED

(75) Inventors: Pierre Ardaud, Sainte-Foy-les-Lyon (FR); Francis John Williams, Llinars del Valles (ES); Jean-Marie Bernard, Mornant (FR); Bernard Vogin, Chaponost (FR)

(73) Assignees: Rhodia Chimie, Courbevoie Cedex (FR); Cray Valley Iberica, Barcelona (ES)

( * ) Notice: Subject to any disclaimer, the term of this patent is extended or adjusted under 35 U.S.C. 154(b) by 0 days.

(21) Appl. No.: 09/497,176

(22) Filed: Feb. 3, 2000

(51) Int. Cl.$^7$ .................. C08G 18/40; C08G 18/80; C09D 175/04; C08L 75/04
(52) U.S. Cl. ........................................ 528/45
(58) Field of Search ............................ 528/45

(56) References Cited

U.S. PATENT DOCUMENTS

| | | | |
|---|---|---|---|
| 3,317,463 A | 5/1967 | Schonfeld et al. | 528/45 |
| 3,991,034 A | 11/1976 | Takeo et al. | 427/27 |
| 4,151,220 A | 4/1979 | Watanabe | 528/45 |
| 4,252,923 A | 2/1981 | König et al. | 525/452 |
| 4,375,539 A | 3/1983 | McBride et al. | 525/440 |
| 4,412,034 A | 10/1983 | Meyer et al. | 524/791 |
| 4,528,355 A | 7/1985 | Gras et al. | 528/45 |
| 4,957,814 A * | 9/1990 | Barbee et al. | 428/402 |
| 5,538,759 A | 7/1996 | Hoppe et al. | 427/385.5 |
| 6,103,826 A * | 8/2000 | Jones et al. | 525/123 |
| 6,291,624 B1 * | 9/2001 | Ardaud et al. | 528/45 |

FOREIGN PATENT DOCUMENTS

| | | |
|---|---|---|
| DE | 3232463 | 3/1984 |
| DE | 3328131 | 2/1985 |
| DE | 4430399 | 2/1996 |
| EP | 0 009 694 | 9/1979 |
| EP | 56167 * | 7/1982 |
| EP | 0 680 984 | 11/1995 |
| FR | 2 266 725 | 10/1975 |

* cited by examiner

Primary Examiner—Rabon Sergent
(74) Attorney, Agent, or Firm—Burns, Doane, Swecker & Mathis, L.L.P.

(57) ABSTRACT

Provided is a composition useful for obtaining a high gloss coating, for example, a high gloss paint. The composition includes an isocyanate which is at least partially masked by one or more masking agent, and having a degree of liberation with respect to the masking agent at 120 ° C. of 5 % or less. A polyol has a glass transition temperature of about 40° C. or more, a hydroxyl number of about 20 mg KOH/g or more and an average molecular weight Mn of about 500 g/mol or more. Also provided is a process for preparing the composition, wherein the isocyanate, the polyol and any other components are preblended in a blender. The polyol and other meltable components of the blend are melted, homogenized and dispersed in an extruder having one or more screws. Further provided are paint compositions, wherein the paint is a high gloss paint. The compositions are environmentally friendly and result in high gloss coatings having beneficial mechanical properties.

50 Claims, No Drawings

COMPOSITIONS USEFUL FOR OBTAINING HIGH GLOSS COATINGS, METHODS OF USING SUCH COMPOSITIONS AND COATINGS THUS OBTAINED

BACKGROUND OF THE INVENTION

1. Field of the Invention

The present invention relates to a novel family of compositions containing masked isocyanates and polyols. The invention relates more particularly to powders, including mixtures of powders, and to their use as powders in coatings such as paints, particularly to high gloss coatings and paints.

2. Description of the Related Art

For reasons associated with protection of the environment and safety at work, it is increasingly sought to eliminate the use of solvents in coating techniques and particularly in paints. More particularly, reducing VOCs (Volatile Organic Compounds) is an increasingly current preoccupation in the paint and varnish industry. With this aim, the development of products with higher solids content makes it possible to decrease the amounts of solvents required to achieve the application viscosity, and thus to reduce the solvents evaporated during drying of paint film.

Another alternative is to use products in aqueous phase in which the water has replaced the organic solvents as the agent carrying the organic binder. However, a small amount of organic solvent is required to use and form the film of paint. Furthermore, they give rise to water-soluble residues which may be tricky and expensive to process.

In this context, coating techniques using powders are increasingly being developed. A few details of this technique should be given herein in order to gain a better understanding of the present invention. The technique uses a very finely powdered material for which air acts as a vector.

In general, an electrostatic charge of several kilovolts applied between a gun and the article to be painted allows the coating precursor powder, which is to be sprayed by the applicator gun, to be attracted and retained.

Firing of the article between 150 and 200° C. allows melting, spreading and then crosslinking of the paint powder (paint being considered the ultimate example for coatings) in order to obtain a uniform and homogeneous layer of the coating.

This technique is non-polluting and has an application yield of close to 100% by virtue of the possibility of recycling the unused powder.

Among the families of products which may be used in this field, mention should be made of the following. The majority of the market is occupied by so-called "epoxy-polyester hybrid" powder paints, followed by polyesters and polyurethanes, and then so called "epoxy" powders.

In order to obtain good quality strength on exteriors (in particular with respect to UV radiation and moisture), it is essential to use coatings based on TGIC (triglycidyl isocyanurate)- polyester or polyurethane which, alone, makes it possible to achieve the required levels of performance.

The coating powders may be in several finishes (surface, aspect, color, sheen, etc.). For example, copending application Ser. No. 09/240,598, filed Feb. 1, 1999, now U.S. Pat. No. 6,291,624, the entire contents of which are herein incorporated by reference, describes compositions for obtaining matt or satin coatings. Such coatings are defined therein as having a coefficient of reflection which is at most equal to about 50% at a 60° angle of incidence.

The compositions of interest in the present case can advantageously provide high gloss coatings. As used herein, a high gloss coating is one which, when applied to a metal support and after crosslinkling, has a coefficient of reflection which is greater than 80%, preferably greater than 85%, more preferably greater than 90% and most preferably greater than 95%, for a 60° angle of incidence.

For further details regarding the techniques of powder painting, reference may be made to the following books: P. Grandou and P. Pastour, *Peintures et Vernis* [Paints and Varnishes], I les constituents, II techniques et industries [techniques and industries]; pub. Hermann; R. Lambourne, *Paints and Surface Coatings, theory and practice*, pub. Halsted Press; *Powder Coating, The Complete Finisher Hand Book*, the Powder Coating Institute; and Myers and Long, *Treatise on Coatings*, 5 volumes, pub. Marcel Dekker.

U.S. Patent No. 3,991,034, to Takeo et al, discloses a polyester resin composition suitable for preparing a powder paint, which comprises a polyester and a polyisocyanate blocked with an alkyl p-hydroxybenzoate. The composition is characterized as being a thermosetting polyester resin composition. The alcohol functionality and the extent of crosslinking of the disclosed compositions are relatively low. The mechanical properties of the coatings formed are therefore lacking.

To overcome or conspicuously ameliorate the problems associated with the related art, it is an object of the invention is to provide compositions which make it possible to obtain high gloss coatings with superior mechanical properties. The compositions are easy to use, and the coatings which can be obtained therefrom advantageously have a high gloss finish and good weather resistance.

It is a further object of the invention to provide a process for preparing the compositions.

It is a further object of the invention to provide paint compositions wherein the paint is a high gloss paint. The paint compositions can be prepared by the so-called powder technique using the inventive compositions.

Other objects and aspects of the present invention will become apparent to one of ordinary skill in the art on a review of the specification and claims appended hereto.

SUMMARY OF THE INVENTION

These aims and others which will appear hereinbelow are achieved by provision of a composition useful for obtaining a high gloss coating. The composition features an isocyanate which is at least partially masked by one or more masking agent, and having a degree of liberation with respect to the masking agent at 120° C. of 5% or less. A polyol has a glass transition temperature of about 40° C. or more, a hydroxyl number of about 10 mg/g or more and an average molecular mass Mn of about 500 g/mol or more.

In accordance with a further aspect of the invention, a composition useful for obtaining a high gloss coating is provided. The composition features an isocyanate which is at least partially masked by one or more masking agent, having a glass transition temperature of about 20° C. or more. A polyol has a glass transition temperature of about 40° C. or more, a hydroxyl number of about 10 mg/g or more and an average molecular mass Mn of about 500 g/mol or more. At least one of the following conditions apply:

the composition further comprises a carboxylic function, with the proviso that, when the carboxylic acid function which is free or in the form of a salt, is greater than 30 mg KOH/g, the amine content is lower than 0.6% (equivalent) of the isocyanate (masked and free);

the composition is essentially free of an esterification, catalyst, especially a carbamatation catalyst, which is solid and/or non-liposoluble;

the composition is essentially free of a matt-effect wax; and the composition further comprises a liposoluble catalyst.

According to a further aspect of the invention, a process for preparing the compositions is provided. The process involves the steps of preblending the isocyanate, the polyol and any other components in a blender, and melting, homogenizing and dispersing the polyol and other meltable components of the blend in an extruder having one or more screws.

In accordance with a further aspect of the invention, high gloss paint compositions comprising the composition are provided.

As used herein, the term "about" is used to emphasize the fact that the value is rounded up and that, when the figure(s) furthest to the right of a number are zeros, these zeros are positional zeros and not significant figures unless, of course, otherwise stated.

Also as used herein, the term "essentially free" means that the component in question is absent from the composition, or is present in such an insignificant amount that a high gloss coating can be obtained from the composition.

A carboxylic function is advantageously in intimate mixture with the a isocyanate component of the composition. It is even desirable for a carboxylic function to be grafted onto the isocyanate system via an agent bearing both a reactive function (i.e., having a so-called labile hydrogen) with the isocyanate function and a carboxylic function (COOH in salt form or, advantageously, in free form). It is highly desirable for this agent bearing a carboxylic function to be a masking agent.

It is preferable for the masking group to bear the labile hydrogen which reacts with the isocyanate function via an oxygen in order to give the sequence —NH—CO—O— (i.e., R—NCO+HO—>R—NH—CO—O—).

DETAILED DESCRIPTION OF PREFERRED EMBODIMENTS OF THE INVENTION

According to the present invention, a composition useful for obtaining a high gloss coating includes an isocyanate and a polyol. The isocyanate is advantageously masked with at least one masking group bearing at least one ester function derived from acid functions and especially acid and ester functions. The masking may be mixed and may involve several masking groups.

The masked isocyanate has a "liberation" or "deblocking" temperature, typically quantified by the octanol test (described below), which is the lowest temperature at which the masking agent of the masked isocyanate is $9/10$ (mathematically rounded-up) displaced by a primary monoalcohol (generally octanol).

In order to ensure a good shelf life, it is preferable to choose masked isocyanate functions whose octanol test shows a "liberation" at 80° C., advantageously at 90° C., which is at most equal to 90%.

In the structure of the isocyanate(s), it is desirable for the part of the skeleton connecting two isocyanate functions to contain at least one polymethylene chain $(CH_2)$ $\pi$, where $\pi$ represents an integer from 2 to 10, advantageously from 4 to 8. This preference results in improved mechanical performance levels. When there are several chains, they may be similar or different. In addition, it is desirable for at least one and preferably all of these chains to be free to rotate and thus be exocyclic.

According to the present invention, the masked isocyanate, pure or as a mixture, is derived from a polyisocyanate; that is to say a compound having at least two isocyanate functions, advantageously more than two. Fractional values are possible since a mixture of more or less condensed oligomers is generally present. This polyisocyanate itself is usually derived from a precondensation or a prepolymerization of unitary diisocyanate (occasionally referred to in the present description as "monomer").

In general, the average molecular mass of these prepolymers or precondensates is 2000 or less (one significant figure), more commonly 1000 or less (one significant figure, preferably two).

Thus, among the polyisocyanates used for the invention, mention may be made of those of the biuret type and those whose di- or trimerization reaction has led to four-, five- or six-membered rings. Among the six-membered rings, mention may be made of the isocyanuric rings obtained from a homo- or a hetero-trimerization of various diisocyanates alone, with other isocyanate(s) (mono-, di-or polyisocyanate (s)) or with carbon dioxide, in which case a nitrogen of the isocyanuric ring is replaced by an oxygen. Oligomers containing isocyanuric rings are preferred.

The preferred polyisocyanates are those which have at least one aliphatic isocyanate function. In other words, at least one isocyanate function masked according to the invention is connected to the skeleton via an $sp^3$-type carbon advantageously bearing a hydrogen atom, preferably two. It is desirable for the $sp^3$-type carbon itself to be borne by an $sp^3$-type carbon and advantageously carry dio one, preferably two, hydrogen atoms, in order to prevent the isocyanate function from being in a neopentyl position. In other words, it is recommended to choose as the monomer (which, in general, bear two isocyanate functions) at least one compound which bears at least one aliphatic function which is neither secondary nor tertiary nor neopentyl.

In the case of a mixture obtained from several (generally two) types of monomers, it is preferable that the monomers satisfy the above conditions and/or (advantageously "and") a condition regarding the presence of a polymethylene chain $(CH_2)$ $\pi$, to represent at least $1/3$, advantageously $1/2$, preferably $2/3$ of the masked isocyanate functions. Excellent results can be obtained with mixtures containing two-thirds HMDT (hexamethylene diisocyanate trimer) with IPDI (isophorone diisocyanate) or IPDT (isophorone diisocyanate trimer), the two being masked according to the invention. nBDI (norbornane diisocyanate) and its trimer are similar to the IPDI and IPDT.

The case in which all of the isocyanates are aliphatic and satisfy the above criterion is preferred.

The agents leading to the masking groups characteristic of the invention are advantageously selected from those which are obtained from the condensation of an aromatic derivative hydroxylated on the ring and bearing a function chosen from nitrile and, preferably, carbonyl functions with an isocyanate. The condensation takes place on the phenol function.

Among the members of the family of masked isocyanates, it is convenient to choose those for which an apparent melting point may be determined, this measurement being carried out at room temperature (20° C.). This melting point should be 30° C. or more (one significant figure), advantageously 50° C. or more It is preferable to choose an agent from among those of formula (I):

$$Ar(R)_n(Y-Z)_m(OH)_p \qquad (I)$$

where Ar is an aromatic residue on which are grafted n substituents R, m polar functions Z selected from nitriles and carbonyl groups, and p hydroxyl functions.

Values of n, m and p are such that the sum n+m+p is at most equal to the number of substitutable chain members; p is advantageously at most equal to two and is preferably equal to one.

Advantageously, m is at most equal to two and is preferably equal to one.

Advantageously, n is at most equal to three, preferably chosen from zero, one and two, and is more preferably equal to zero.

R represents substituents that are inert towards the masking reaction and, in general, corresponds to hydrocarbon chains, usually alkyl chains in the etymological sense of the term, namely an alcohol whose hydroxyl function has been removed.

Two vicinal substituents R may be connected together to form a ring which may, for example, be aromatic.

Z is advantageously selected from groups having a carbonyl function. Among these functions, mention should be made of alkoxycarbonyl functions (ester functions), amide functions, ketone functions, with the preferred condition that there be acidic hydrogens [that is, the function advantageously does not bear hydrogen or, if it does, the corresponding pKa is at least equal to about 20 (one significant figure, preferably two), and more preferably at least equal to about 25] α to the carbonyl function (ester, ketone or amide). Thus, the preferred amides (including lactam or even urea) are advantageously substituted, preferably, sufficiently for there to be no hydrogens on the nitrogen of the amide function or such that there be no reactive hydrogens.

Y is chosen from divalent groups, advantageously —O—, —S—, —NR— and —CR'R"— with R' and R" selected from hydrocarbon radicals, advantageously alkyls, of 1 to 6 carbon atoms, advantageously of 1 to 4 carbon atoms, preferably methyl, more preferably hydrogen; and preferably Y represents a single bond.

It is preferable for the polar function(s) Z (generally chosen from the nitrile function and/or the carbonyl functions) not to be vicinal to the group Z as, for example, in salicylic acid.

The aromatic residue Ar comprises one or more hetero- or homocyclic, advantageously fused rings. It is preferable for Ar not to contain more than two rings and preferably not more than one ring.

The aromatic residue Ar may consist of one or more heterocyclic or homocyclic rings, usually homocyclic on account of their ease of access. The value of six-membered heterocycles, which have a liberation temperature very much lower than that of the corresponding homocycles, should, however, be pointed out.

It is desirable for the total number of carbons in the aromatic derivative hydroxylated on the ring to be at most equal to 20, preferably equal to 10 (one significant figure).

This ring is advantageously six-membered, the ring units consisting of carbon or nitrogen with the number of substituents required for the valency of these atoms.

Among the acids and derivatives, especially esters, which give the most satisfactory results, mention should be made of acids grafted onto a benzene ring. Thus, meta-hydroxybenzoic acid and, especially, para-hydroxybenzoic acid, and their derivatives, give good results.

As has been mentioned above, it is possible to provide several groups (preferably two for economic reasons) masking the isocyanate functions. This diversity may be achieved by mixing various masked (in general with only one masking group) compounds or preferably by coreaction. These masking groups may all be as defined above or only some of them may correspond to this definition. In the latter case, it is preferable for those (that is to say the sum of those) which bear a carbonyl (ester or acid) function advantageously to correspond to the above formula (I) and to correspond to at least about 10% (expressed as blocked isocyanate function), advantageously to about 20%, preferably to one third.

The presence of a carboxylic acid function (—COOH) and in particular of a carboxylic acid function grafted directly onto an aromatic ring, preferably a benzene ring, makes it possible to increase the melting point of the blocked isocyanate. However, it is preferable, in order to retain the excellent mechanical properties of the system according to the present invention, for the amount of acid function present (in terms of equivalents) to be at most equal to about $9/10$, advantageously to about $4/5$, preferably to $2/3$, more preferably one third of the isocyanate functions. When the carboxylic functions are borne by agents which are not released under the baking conditions, in order to preserve the crosslinking power, it is desirable for the amount of acid borne by the agents which is not released to be not more than $1/2$, advantageously $1/3$, of the total amount of isocyanate functions (free, masked, associated with an unreleasable masking agent (e.g., aminocaproic acid).

The beneficial effects of the acid functions on the glass transition temperature (Tg) can be obtained from 5% (equivalent) of the isocyanate functions present, preferably from about 10% (equivalent) of the isocyanate functions present, and most preferably from at least 20% (equivalent) of the isocyanate functions present, to obtain an effect which is close to the inflection point of the curve. The melting point and the glass transition temperature (Tg) continually overlap with the acid content up to 100% (equivalent) of the isocyanate functions present.

In the case involving an ester/acid couple, and in particular in the case involving an alkyl hydroxybenzoate/hydroxybenzoic acid couple, beneficial properties can be obtained in the region of a $9/10$ molar ratio; i.e., about $9/10$ of ester and about $1/10$ of acid. The presence of the acid functions to a level of about $1/10$, in particular carboxylic, allows good catalysis of the crosslinking.

The effects outlined above for the isocyanate compounds masked with two or more masking agents can be obtained either with a mixture of two or more to isocyanates masked with a single masking agent or with isocyanates masked simultaneously or successively with two or more masking agents. The latter case gives better results correlated to the existence of so-called mixed molecules, i.e., molecules for which at least one of the isocyanate functions is masked with a group bearing an acid function and in which at least one of the other isocyanate functions is masked with a group not bearing an acid function. The positive effects of the presence of these so-called mixed molecules are experienced once they correspond to (i.e., once they bear) about 5% of the isocyanate functions, advantageously 10%.

Thus, one of the most advantageous uses of the present invention comprises using isocyanates which are at least partially masked by a compound bearing an acid function, advantageously by a compound of formula I where Z is an acid function. It is recommended that the isocyanate then be masked by a group other than that bearing the acid function, and that the acid function of the masking system be between 90 and 10% (expressed as blocked isocyanate function), the other masking agent or agents may be either masking agents which are known per se (which satisfy the liberation temperature and the unmasking constraints specified in the present description), or an ester corresponding to formula I. The latter alternative form is preferred. For the synthesis of these compounds, reference may be made to the general procedures of patent application No. EP 0 680 984 A, the entire contents of which are incorporated herein by reference, which gives good results for the operation of (optionally partial) masking by a compound of formula I.

The masking agents most commonly used are those mentioned in M. Wicks, "Blocked Isocyanates," *Process in Organic Coatings*, Vol. 3 (1975), p. 731. Their deblocking temperature is advantageously greater than 90° C.

The masking agents can be divided into three groups:
  those in which the labile hydrogen is borne by a chalcogen;
  those in which the labile hydrogen is borne by nitrogen; and
  those in which the labile hydrogen is borne by carbon.

Among those in which the labile hydrogen is borne by a chalcogen, preferably a light chalcogen (i.e., sulphur and oxygen), typically oxygen is used. Among the latter, mention may be made in particular of:
  products containing an >N—OH sequence, such as, for example, oximes (=N—OH) or hydroxyimides ([—CO—]$_2$N—OH);
  phenols (in the strict sense), especially those in which the aromatic ring is electron-poor, such as the hydroxybenzoates described by the present invention; and
  mention may also be made of the compounds described in application EP-A-661,278.

Among those in which the labile hydrogen is borne by a nitrogen, mention may be made in particular of:
  monosubstituted amides, and in particular lactams, typically caprolactam; imides ([—CO—]$_2$N—H), especially cyclic imides such as succinimide;
  unsaturated nitrogenous heterocycles which are, in particular, 5-membered (advantageously diunsaturated), preferably containing at least two hetero atoms (preferably nitrogen); among the latter, mention may be made of diazoles (such as glyoxalines and pyrazoles), triazoles or even tetrazoles; and
  mention may also be made of the compounds described in application EP-A-661,278.

The masking agents in which the labile hydrogen is borne by carbon are essentially compounds of malonic nature, i.e., a radical RCH< bearing two electron-withdrawing groups (such as carbonyl, nitrile, Rf. i.e., perfluoroalkyl).

The above masking agents (alone or as a mixture) can be used to carry out the present invention provided that the following two conditions are satisfied:
  they are combined with an agent (advantageously a masking agent) bearing carboxylic functions) and a reactive function (which can advantageously be released on baking) with the isocyanate functions (with the preferences indicated in the present description);
  the compounds obtained from the reaction between the isocyanate, on the one hand, and the masking agent and the agent bearing carboxylic functions), on the other hand, has the required glass transition temperature (Tg) and melting point.

One of the advantages of using carboxylic groups according to the present invention lies in the fact that it allows masking groups to be used which, in the absence of carboxylic group, would not have a sufficient melting point or glass transition temperature (Tg) for use in powder application. This is the case in particular for triazoles, which, when they are unsubstitulted (each of the isomers alone or as a mixture in any proportion of the isomers), are particularly cost-effective.

When only one masking agent is used, it is desirable for this to be a compound according to formula I where Z is ester, with the preferences indicated in patent application No. EP 0 680 984 A, page 2, lines 41 to 50.

As has already been mentioned according to the present invention, it is preferable for the melting point of the compound or of the mixture of compounds obtained to have an apparent melting point which is at least equal to about 30° C., preferably 50° C.

It is also preferable for the glass transition temperature to be 10° C. or, more preferably 20° C. or more, and more preferably 25° C. or more.

It is preferable to choose the compounds according to the present invention such that they react completely with a primary alcohol at 250° C. in less than half an hour.

For purposes herein, the reaction is considered to be complete if it proceeds to 90% or more.

As has been mentioned above, the isocyanates for which the invention is most advantageous are those whose nitrogen atom is linked to a carbon of Sp$^3$ hybridization, and more particularly aliphatic isocyanates, and especially polymethylene diisocyanates (for example TMDI [tetramethylene diisocyanate] and HMDI [hexamethylene diisocyanate= OCN—(CH$_2$)$_6$—NCO]) and their various condensation derivatives (biuret and the like) and di- and trimerization derivatives (in the field under consideration the term triner refers to mixtures derived from the formation of isocyanuric rings from three isocyanate functions; in fact, along with the actual trimer, there are heavier products derived from the trimerization).

According to the present invention, it is desirable for the percentage of residual free isocyanate function to be 5% (equivalent) or less, advantageously 3% (equivalent) or less, preferably 1% (equivalent) or less. As used herein, the term "completely blocked" means that the residual free isocyanate function is about 5% (equivalent) or less.

The highest melting points or glass transition temperatures are obtained with a percentage of residual free isocyanate function not exceeding 0.5%. The contents of aromatic derivative hydroxylated on the ring are also advantageously low, that is to say 5% or less, advantageously 3% or less, preferably 1% or less.

On the other hand, the presence in the isocyanate of unmasked trimers of cycloaliphatic monomers such as IPDT or nBDT up to a content of ⅓ by weight have a favorable effect on the glass transition temperature (Tg) and do not in any way hinder the production of a high-quality coating. Such compositions can readily be obtained by mixing the unmasked trimer in the molten masked compound.

The compositions in accordance with the invention further include a polyol compound (also referred to herein as "resin", "polymer" and "hydroxylated polymer"). Polyol compounds which may be used are those which can provide powder paints or powder varnishes having a high gloss, such as hydroxylated acrylic resins and/or linear or branched, hydroxylated, saturated or unsaturated polyesters having an appropriate molecular weight and capable of being crosslinked by a reaction with the isocyanate prepolymer which is at least partially masked.

As described above, the isocyanate prepolymer is provided with masked (or blocked) active functions and it is activated thermally by liberation of the blocking agent, by exchanging the isocyanate groups which react with the hydroxyl groups of the binder, in the presence or absence of catalysts.

This system makes it possible to obtain powder paints having a suitable viscosity on melting and a glass transition temperature of about 40° C. or more, thereby allowing for chemical and physical stability during storage.

The possible functionality of the carboxyl function, which defines the molecular weight of the polymer, thus allows a double-crosslinking with aromatic or aliphatic epoxy resins and/or hydroxyalkylamides.

The content of acidic groups is determined by the acid number of the material, expressed in milligrams of potassium hydroxide required to neutralize the free acidity of one gram of polyol.

The acid number of the polyol is typically about 20 mg KOH/g or less, advantageously 15 mg KOH/g or less. It is also advantageously 2 mg KOH/g or more, preferably 4 mg KOH/g or more. Hydroxylated polymers whose acid number is between 3 and 15 mg KOH/g can advantageously be used.

The hydroxyl number corresponds to the milligrams of potassium hydroxide required per gram of resin in order to neutralize the excess acetic acid liberated during acetylation (with acetic anhydride) of the hydroxylated polymer. For further details, reference may be made to standard ASTM-E222.

The hydroxyl number of the hydroxylated polymer is typically about 20 mg KOH/g or more, preferably about 30 mg KOH/g or more, and more preferably about 40 mg KOH/g or more. The upper limit is typically 400 mg KOH/g or less.

The glass transition temperature of the polyol is typically 40° C. or more, preferably 40° C. to 100° C.

The number-average molecular weight Mn of the polyol is typically about 500 g/mol or more, preferably from about 1000 to 6000 g/mol. The molecular weight is determined by gel permeation chromatography (GPC). The technique uses, as gels, two polystyrene gels (Ultrastyragel® at $10^4$ and 500 Å), THF as the solvent and sulphur as the standard.

When the composition in accordance with the invention is used as a coating composition, for example, as a paint composition, the isocyanate and the polyol are components of a binder. The glass transition temperature of the binder is typically from 20° C. to 100° C., preferably from 40° C. to 100° C.

The number-average molecular weight Mn of the binder is advantageously from 500 to 15,000 g/mol.

Its degree of branching, i.e., the average number of free OH functions per molecule of the hydroxylated polymer is between 2 and 4. It is desirable for the degree of branching to be between 2 and 4, advantageously between 2.5 and 3.5.

Branching may be obtained using polyols having a functionality of more than two (in general triols) or polyacids (often used in the form of anhydride in order to reduce the amount of water released during the reaction) having a functionality of more than two. In particular, trimellitic acid, especially in the form of anhydride is very favorable.

In the case of hydroxylated polyesters, the product of the esterification of one or more aliphatic, aromatic or cycloaliphatic di- or polycarboxylic acids or anhydrides or their methyl esters, which contain 2 to 36 carbon atoms, is used. For example, mention may be made of adipic acid, succinic acid, sebacic acid, suberic acid, azelaic acid, decanedicarboxylic acid, glutaric acid, terephthalic acid, isophthalic acid, phthalic acid or anhydride, naphthalenedicarboxylic acid, hexahydrophthalic acid or anhydride, 1,4-cyclohexanedicarboxylic acid, dimerized fatty acids and trimellitic anhydride.

The molecular weight of the polymer may be adjusted by adding aliphatic or aromatic monocarboxylic acids, or their methyl esters, having 2 to 18 carbon atoms.

The percentage of the acid(s) or anhydride(s) described above within the polymer mixture is from 20 to 70%, preferably from 30 to 60%, taken individually or mixed.

If the polymer of the present invention is unsaturated, di- or polycarboxylic acids or anhydrides unsaturated as olefins, such as maleic acid or anhydride, tetrahydrophthalic acid or anhydride, fumaric acid, hexachloroendomethylenetetrahydrophthalic acid or anhydride, methylmaleic acid, itaconic acid or derivatives of dicyclopentadiene, or of methylmaleic, itaconic, maleic or fumaric acid may be used.

Among the polyhydroxylated alcohols which are useful for synthesizing the polyester are: ethylene glycol, 1,2- or 1,3-propylene glycol, 2-methylpropanediol, diethylene glycol, dipropylene glycol, 1,4-butanediol, 2,3-butylene glycol, 1,6hexanediol, 1,5-pentanediol, neopentyl glycol, cyclohexanedimethanol, triethylene glycol, neopentyl glycol hydroxypivalate, tetraethylene glycol, polyethylene glycol, polypropylene glycol, dibutylene glycol or polyethylene glycols, trimethylpentanediol, butylethylpropanediol, glycerol, trimethylolpropane, hexanetriol, pentaerythritol, sorbitol, trimethylolethane and tris(2-hydroxyethyl) isocyanurate. The percentage of these may range between 10 and 60% by weight based on the composition, preferably between 10 and 50% by weight.

For the preparation of the polyesters, and in particular during creation or conversion of the ester bond, it is indicated to use catalysts which are known "per se" for the esterification; these catalysts, which may be found in the final composition if not filtered, may be used alone or as a mixture. The composition is preferably essentially free of catalysts which would adversely affect the desired sheen (i.e., high gloss) of coatings formed from the composition. Such catalysts which are to be avoided include, for example, those of low liposolubility and solid form. The low liposoluble catalysts are only sparingly soluble or are insoluble in the media (e.g., chlorobenzene+octanol) of the octanol test (see below). Thus, the esterification catalyst is preferably liposoluble and non-solid. An exemplary such catalyst is dialkylcarboxyloxyltin (e.g., DBTL).

Among the catalysts which may be used in the context of the present invention, mention should be made more particularly of those based on Lewis acids, which are advantageously organic. Among the Lewis acids, mention should be made of those based on titanium, such as titanium tetrachloride, tetra-n-butyl titanate, isopropyl titanate, tetrakis(2-ethylhexyl) titanate, titanium acetylacetonate, stearyl titanate, nonyl titanate or cetyl titanate, those based on vanadium such as isopropyl vanadate or n-butyl vanadate, those based on zirconium such as zirconium tetrachloride, n-propyl zirconate or n-butyl zirconate, those based on tin such as anhydrous or hydrated tin chlorides, dibutyltin oxide, tin octanoate, butyltin hexanoate, tin oxalate, monobutyltin oxide, monobutylchlorotin dihydroxide, dibutyltin dilaurate, dibutyltin diacetate and monobutyltin tris(2-ethylhexanoate).

In the event an insoluble catalyst is used, it is desirable to eliminate or reduce its presence in the final composition, for example, by filtration.

Addition of the compounds of the above types makes it possible in particular to reduce the manufacturing time and the emission of volatile compounds, and allows optimization of the final color of these polyols which is particularly suitable for the present invention.

In the case where a methyl ester (of di- or polycarboxylic acids) is used at the start, it is very desirable to use those of the above catalysts which are known for giving satisfactory catalysis of the transesterification, or to introduce other catalysts which are known to do this, for example zinc carboxylates, antimony trioxide or any other catalyst known to those skilled in the art in the technical field of condensation. The amounts to be used are advantageously between ½ and 1%. by weight of the initial charge.

Besides working in an inert atmosphere, in order to improve the polymer or to protect it from coloration during the esterification process, it is preferable to add antioxidant additives such as triphenyl phosphate, tris(nonylphenyl) phosphate, stearylpentaerythritol diphosphite or equivalents thereof. These compounds are preferably used in an amount at least equal to 5 per thousand and at most equal to 15 per thousand.

In order to obtain the polyester mentioned above, techniques which are known per se are used. Typical reaction conditions include, for example, a final temperature of between about 200° C. and 260° C., and an absolute pressure between 5 hectopascals and 800 kilopascals.

The acid number and the hydroxyl number should be controlled. The alkalinity is adjusted to the point at which it is possible to obtain the best properties of covering of the polyurethane. Thus, before unloading, in principle in a refrigerated chamber, catalysts, antioxidants and any additive required for the final application should be incorporated.

The polyesters used for the present invention have a glass transition temperature (Tg) of between 40 and 80° C., preferably between 50 and 70° C., in order to give the system the stability required during storage. It is possible to use mixtures of amorphous and crystalline polyesters, the appropriate proportions of which should allow both good chemical and physical stability. The Tg of the polymer is determined by calorimetry by differential analysis (DSC).

In the case in which hydroxylated acrylic polymers are used, only one binder is typically used, the Tg being between 40 and 100° C. Alternatively, mixtures comprising from 0 to 30% by weight of an acrylic polymer, with a Tg of from −20 to 50° C., or from 70 to 100% by weight of a hydroxylated acrylic polymer, with a Tg of from 40 to 100° C., can be employed. With the mixture, the system may be treated easily and have good stability during storage, as well as good chemical and mechanical properties.

The hydroxylated acrylic polymers may be obtained by reacting alpha,beta-unsaturated ethylene monomers, in particular vinylaromatic monomers and esters of alpha,beta-unsaturated ethylenecarboxylic acids. Mention may be made, for example, of styrene and its derivatives, such as methylstyrene or chlorostyrene. In the case of products for exteriors, they can be present in amounts of from 5 to 54% by weight, preferably from 10 to 25% by weight of the monomers as a whole. Amounts less than 5% by weight may adversely affect the corrosion resistance.

Among the alpha,beta-unsaturated ethylene acid esters, mention may be made of acrylic and methacrylic acid esters such as methyl acrylate, ethyl acrylate, butyl acrylate, 2-ethylhexyl acrylate, dodecyl acrylate, methyl methacrylate, ethyl methacrylate, butyl methacrylate, 2-ethylhexyl methacrylate and lauryl methacrylate. Preferably, the unsaturated esters are present in an amount of from 5 to 8% by weight, and correspond to a mixture of esters of alkyl having from 1 to 3 carbon atoms and from 4 to 20 carbon atoms, for example a mixture of methyl methacrylate and butyl acrylate.

The hydroxyl functionality of the acrylic polymer is imparted by the copolymerization of monomers having hydroxyl groups, such as hydroxyethyl methacrylate and acrylate, and hydroxypropyl acrylate and methacrylate, in amounts of from 5 to 80% by weight. This percentage, which relates to the monomers as a whole, being necessary in order to obtain the hydroxyl number indicated.

The acrylic polymer may have a certain acid number, normally less than 15, derived from the addition of acrylic acid, methacrylic acid, itaconic acid or fumaric acid and/or of maleic acid or anhydride.

To prepare the acrylic polymers, the various monomers are mixed together and are reacted by free-radical polymerization. Among the initiators which may be used, mention may be made in particular of benzoyl peroxide, tert-butyl hydroperoxide, di-tert-butyl peroxide and azobisisobutyronitrile. Chain-transfer agents such as mercaptopropionic acid, dodecyl and lauryl mercaptan may be used to adjust the molecular weight.

The polymerization is carried out in solution, using a solvent in which the monomers are soluble, such as toluene, xylene, butyl acetate, propylene glycol methyl ether acetate, etc. Once the polymerization is complete, the reaction mixture is evaporated, under vacuum, in order to remove the organic solvent and to recover the solid polymer. The residual content of solvents or volatile compounds should be less than 0.5% by weight.

When the hydroxylated acrylic polymers are used in accordance with the conditions described above, satisfactory crosslinking with a prepolymer containing isocyanate functions masked according to the present invention is indeed obtained. The mechanical properties, however, remain insufficient for uses in which they are subject to bad weather. Thus, it is preferred to use polyisocyanate and saturated polyester systems.

The acid number of the polymer makes possible reaction of the carboxyl groups with aliphatic, aromatic and/or betahydroxyalkylamide polyepoxides. Double-crosslinking is thus obtained.

The catalyst content in the binder is typically at least equal to 0.5% by weight, advantageously at least equal to 1% by weight and preferably at least equal to 2% by weight. It is preferable for the content not to exceed 5% by weight, advantageously 3% by weight, preferably 2% by weight. As most catalysts are based on elements of metallic nature, it may be more practical to express this characteristic in terms of atomic equivalents. In this case, it is expressed that a content at least equal to 0.003 equivalent per kg mass (of binder), advantageously 0.005, preferably 0.01 equivalent, should be achieved, and it is preferable for the content not to exceed, on a mass basis, 0.3 equivalent, advantageously 0.2 equivalent, preferably 0.1 equivalent per kg mass (of binder).

It is desirable to avoid or at least minimize the amount of certain catalysts in the compositions, as they are deleterious to the sheen of coatings formed therefrom. Such catalysts are known to enhance a matt finish. Particularly when there are free carboxylic acid functions present in the masking agent, it is desirable to keep the content of such matt-enhancing catalysts to less than 0.6% by weight, preferably less than 0.4% by weight, more preferably less than 0.2% by weight of the composition, and most preferably absent from the composition. Such a catalyst content is particularly desirable when the carboxylic acid functions (free or in the form of a salt, especially when the carboxylic acid functions are borne by an aromatic nucleus) content of the composition is greater than that corresponding to 40 mg KOH/g, even greater than 20 mg KOH/g or 30 mg KOH/g.

Catalysts which should be avoided include, for example, inorganic salts [having a catalytic activity] and/or organic salts (including salts derived from hydrocarbons, such as, for example, those corresponding to the "anion" $CH_3CH_2$—), such as sulphonate, carboxylate, acetylacetonate, phosphate, phosphonate or phosphinate, which have few or no methylene or methyl units.

Additionally, mention may be made of those which are reputed to catalyze allophanation reactions, tin II salts, such as pyruvate, oxalate, halide and in particular chloride, organic bases in which the basic function is borne by a nitrogen or phosphorus atom, such as phosphines and amines.

The catalysts may be introduced at various steps in the preparation of the powder paint, in particular during the blending before the final extrusion or during the preceding operations, in particular in the polyols after the condensation.

The binder of the present invention makes it possible to obtain high gloss coatings using additives, fillers, pigments and manufacturing processes known to those familiar with the manufacture of powder coatings. The presence of (matt-effect) waxes in the coating composition, however, should be avoided to ensure the formation of high gloss coatings. The fillers and pigment together may reach ⅔ of the mass of the binder.

In the formulation of paints, the appropriate pigments which make it possible to obtain the desired color should be present, it being possible for these pigments to range between 1 and about 50% by weight of the total of the powder paint. Typical pigments include, for example, titanium dioxide and titanium dioxides treated with zirconium oxide. Fillers may thus be used in the formulation in amounts of between 5 and 40% by weight.

Paints or varnishes which can be prepared according to the present invention may also contain the various types of additives, which are known per se, such as degassing agents, levelling agents, antioxidants and UV absorbers (anti-LTV agents or anti-UV agents).

Thus, as recommended degassing agents, mention may be made of benzoin, present in particular in an amount of from 0.5 to 3% by weight, which makes it possible to release the volatile compounds from the film during hardening and to prevent defects such as the formation of craters or pits.

The spreading additives recommended are acrylic polymers, fluoro polymers or polymeric siloxanes, in amounts of from 0.5 to 5% by weight added directly as a "master batch" into suitable polymers or absorbed onto silica.

In order to improve the exterior strength and the resistance to over-firing or to hardening in ovens with direct gas injection, it is recommended to add to the formulations UV-absorbing compositions and/or antioxidants of the primary and/or secondary type, of the phenolic type or alkyfaryl phosphates. Such additives may be present in the formulation in an amount of from 0.5 to 2% by weight of the paint as a whole.

In order to reduce the hardening (crosslinking) temperature, catalysts for formation of urethane, such as DBTDL (dibutyltin dilaurate) may be added to the formulation, directly into the premix or as a master batch.

The powder paints which form the subject of the present invention may advantageously be manufactured by melt-blending the compounds of the formulation. Firstly, they are preblended in a blender and are then melted, homogenized and dispersed in an extruder which has one or more screws.

It is desirable for the mixing, blending and extrusion temperature to be at most equal to about 130° C. or less, advantageously about 110° C. or less, preferably 100° C. or less (3 significant figures). It is desirable for the extrusion temperature to be about 60° C. or more, advantageously to about 70° C. or more, preferably from about 80 to 90° C. The extruded material obtained is left to cool and is passed through a mill until a paint composition having the desired particle size is obtained. In general $d_{90}$ is about 200 micrometers or less, advantageously 100 micrometers or less (two significant figures), and $d_{10}$ is about 20 micrometers or more, advantageously about 50 micrometers) or more. Such a composition can be applied, for example, to metal supports such as steel, aluminum or other alloys, glass, plastic or wood.

The ratio between the polyol(s) and the isocyanate(s) is defined by the deblocking stoichiometry. The amount of isocyanate stoichiometrically required to react with all of the free hydroxyl is generally chosen, with a tolerance of 20%, advantageously of 10%, preferably of 5%. As it is preferable to have an excess of isocyanate, slightly offset ranges are preferred. In other words, the amount of isocyanate to be added is advantageously at least equal to about 90% and at most equal to about 120% of the stoichiometric amount; preferably, it is at least equal to 95% and at most equal to about 110% of the stoichiometric amount; the most common and thus the most desirable range is at least equal to 100% (three significant figures) and at most equal to 105% of the stoichiometric amount. When systems having a high proportion of free acid (for example at least ⅔ of the masked isocyanate functions, see above) are used, it may be envisaged to increase the ratio between isocyanate and hydroxyl function from 10 to 30 points (%) approximately relative to the above values.

The powder obtained may be applied with an electrostatic gun or by a fluid bed. The preferred application of the present invention is that carried out with the Corona-discharge and Corona-effect electrostatic gun or by friction (triboelectric).

The substrate onto which the paint is applied, typically steel or aluminum, may or may not be preheated before the application. Once applied, the powder is melted and hardened in an oven for 10 minutes to two hours at a temperature of from 140 to 220° C., depending on whether or not the system is catalyzed, generally for 10 to 30 minutes at a temperature of from 180° to 220° C.

Bearing in mind the preceding text, a person skilled in the art will adapt the firing by recalling that increasing the firing temperature makes it possible to decrease the firing time, and vice versa.

The present invention will be better understood with the aid of the illustrative examples which follow, in which various paint compositions are compared.

EXAMPLES

The components of each of the paints in the amounts shown in Table 1 were blended in a blender and then homogenized separately and by melting in a single-screw extruder of the Bilss PCS-30 type, at a temperature between 80 and 120° C. As indicated in Table 1, Sample 1 is a comparative sample and Samples 2–4 are compositions in accordance with the invention.

The extruded material was left to cool and it was flaked on cooling rollers, ground and classified according to the desired shape. Once the two paints were obtained, they were blended ¼ in a high-speed blender. After homogenization, the resulting powder of the mixture was applied electrostatically to steel and aluminum plates. They were hardened for 12 to 15 minutes at 200° C., the temperature of the substrate. Once the hardening was carried out, the sheen of the samples applied was observed. The results and the properties are summarized in Table 2.

TABLE 1

| Comment | Tradename | Marketed by | Sample 1 (Comp) | Sample 2 | Sample 3 | Sample 4 | Sample 5 |
|---|---|---|---|---|---|---|---|
| Saturated hydroxylated polyester | Reafree 3300 | Cray Valley | 486.6 | 489.5 | 489.5 | 495.0 | 495.0 |
|  | Reafree F3300-A15 | Cray Valley | 26.0 | 36.0 | 35.0 | 35.0 | 35.0 |
| >2% (equiv) amine | Tolonate (TO3-6315) | Rhodia | 162.4 |  |  |  | 143.0 |
| 0.08% (equiv) amine | Tolonate (TOL-6321) | Rhodia |  | 148.5 |  |  |  |
|  | Tolonate (TOL-6370) | Rhodia |  |  |  |  |  |
| 0.5% (equiv) amine | Tolonate (TOL-6406) | Rhodia |  |  |  | 143.0 |  |
| 0.06% (equiv) amine | Tolonate (TOL-6409) | Rhodia |  |  | 148.5 |  |  |
|  | Reafree 7300 | Resisa | 28.0 | 28.0 | 28.0 | 28.0 | 28.0 |
| TiO$_2$ | Kronos 2160 |  | 296.0 | 296.0 | 296.0 | 296.0 | 296.0 |
|  | Benzoin |  | 2.0 | 2.0 | 3.0 | 3.0 | 3.0 |

TABLE 2

| Composition | Sample 1 (Comp) | Sample 1 (Comp) | Sample 2 | Sample 2 | Sample 3 | Sample 3 | Sample 4 | Sample 4 | Sample 5 | Sample 5 |
|---|---|---|---|---|---|---|---|---|---|---|
| Substrate Material | Steel | Al | Steel | Al | Steel | Al | Steel | Al | Steel | Al |
| Baking | 180° C. 15 min. | 180° C. 15 min. | 180° C. 16 min. | 180° C. 16 min. | 180° C. 19 min. | 180° C. 15 min. | 180° C. 15 min. | 180° C. 15 min. | 180° C. 15 min. | 180° C. 15 min. |
| 20° sheen | 42.9 | 40.2 | 93.2 | 84.6 | 72.2 | 74.7 | 92.2 | 92.5 | 43.6 | 43.6 |
| 60° sheen | 77.2 | 76.7 | 92.4 | 84.4 | 93.1 | 94.4 | 97.0 | 96.7 | 80 | 78.1 |
| 85° sheen | 96.0 | 84.6 | 101.8 | 103.2 | 100.0 | 102.1 | 98.6 | 100.0 | 91.0 | 80.7 |
| Impact (cm) (direct/indirect) | 75/76 | — | 76/75 | — | 76/75 | — | 75/75 | — | 75/75 | — |
| Adhesion | 100/>7 | — | 100/>7 | — | 100/>7 | — | 100/>7 | — | 100/>7 | — |
| Folding (conical mandrel) (%) | 100 | — | 100 | — | 100 | — | 100 | — | 100 | — |
| Resistance to methyl ethyl ketone (butanone) (double passage) | >200 | — | >200 | — | >200 | — | >200 | — | >200 | — |

The comparative paint composition of Sample 1 resulted in coating which was not of high gloss. This is evidenced by the measured coefficients of reflection for a 60° angle of incidence. This result is likely due to the relatively high content of amine (>2% equivalent) present in the composition. In contrast, the paint compositions in accordance with the invention (Samples 2–5) exhibited excellent high gloss appearance as well as excellent mechanical properties.

| OCTANOL TEST - definitions | |
|---|---|
| "liberation" (or "deblocking") temperature | this is the lowest temperature at which the masking agent of the masked isocyanate is 9/10 (mathematically rounded-up) displaced by a primary monoalcohol (the primary alcohol is generally octanol) |
| shelf life | in order to ensure a good shelf life, it is preferable to choose masked isocyanate functions whose octanol test shows a "liberation" at 80° C., advantageously at 90° C., which is at most equal to 90%. |
| reaction progress | the reaction is considered to be complete if it proceeds to more than 90% completion. |

About 5 mmol of protected masked NCO equivalent to be evaluated are loaded into a Schott-type tube with magnetic stirring. 2.5 to 3 ml of 1,2-dichlorobenzene (solvent) and the equivalent of 1-octanol (5 mmol, i.e., 0.61 g, optionally with the catalyst to be tested with the masling group) are added. The reaction medium is then brought to the test temperature. It is then heated for 6 h at the test temperature, so as to deblock the isocyanate functions and thus make them reactive. Once the reaction is complete, the solvent is removed by distillation under vacuum and the residue is analyzed by NMR, mass spectrum and infrared. From these data, the percentage of masked isocyanate function condensed with the 1-octanol is evaluated. The sheens are measured with an uncertainty of 5% (absolute).

While the invention has been described in detail with reference to specific embodiments thereof, it will be apparent to one skilled in the art that various changes and modifications can be made, and equivalents employed, without departing from the scope of the appended claims.

What is claimed is:

1. A composition useful for obtaining a high gloss coating, comprising:

an isocyanate which is at least partially masked by one or more masking agent, and having a degree of liberation with respect to the masking agent at 120° C. of 5% (equivalent) or less; and a polyol having a glass transition temperature of about 40° C. or more, a hydroxyl number of about 20 mg KOH/g or more and an average molecular weight Mn of about 500 g/mol or more.

2. The composition according to claim 1, wherein the content of tin II salts is lower than 0.4% by weight based on the weight of the composition, and having a carboxylic acid function with the priviso that, when carboxylic acid in a free form or in the form of a salt has an acid number greater than 30, the amine content is less than 0.6% (equivalent) of the total isocyanate function (masked and free).

3. The composition according to claim 1, wherein the isocyanate is completely masked by the one or more masking agent.

4. The composition according to claim 1, wherein the masking agent comprises at least one ester function.

5. The composition according to claim 4, wherein the at least one ester function is an ester of an aromatic carboxylic function.

6. The composition according to claim 1 wherein the polyol has a hydroxyl number of from 20 to 400 mg KOH/g.

7. The composition according to claim 1, wherein the polyol has an average molecular weight Mn of from 500 to 15,000 g/mol.

8. The composition according to claim 1, wherein the polyol has a melting point of 130° C. or less.

9. The composition according to claim 1, wherein, after mixing, the composition is in powder form.

10. The composition according to claim 1, further comprising titanium dioxide.

11. The composition according to claim 1, wherein the composition is essentially free of catalyst having at least one of the following characteristics;
a low liposolubility; and
a solid form.

12. The composition according to claim 9, having a particle size wherein a d80 is about 200 micrometers or less, and a d10 is about 20 micrometers or more.

13. The composition according to claim 1, having a coefficient of reflection, when applied to a metal support and after crosslinking, which is greater than 80%, for a 60° angle of incidence.

14. The composition of claim 1, wherein the isocyanate and the polyol form a binder, and the glass transition temperature of the binder is from 20° C. to 100° C.

15. The composition according to claim 1, further comprising one or more additional isocyanates at least partially masked by the one or more masking agents, wherein at least one of the isocyanates contains polymethylene chains (CH$_2$) π where π is an integer of 2 to 10 and said chains represent one third or more of the masked isocyanates.

16. The composition according to claim 15, wherein the isocyanates include hexamethylene diisocyanate and isophorone diisocyanate.

17. The composition according to claim 1, wherein the glass transition temperature of the isocyanate is greater than 10° C.

18. The composition according to claim 1, wherein the glass transition temperature of the composition is greater than 20° C.

19. A process for preparing the composition according to claim 1, comprising the steps of preblending the isocyanate, the polyol and any other components in a blender, and melting, homogenizing and dispersing the polyol and other meltable components of the blend in an extruder having one or more screws.

20. The process according to claim 19, wherein the blending temperature and the extrusion temperature are about 130° C. or less.

21. The process according to claim 19, further comprising steps of cooling followed by grinding the extrudate, the ground extrudate having a particle size wherein a d90 is about 200 micrometers or less, and a d10 is about 20 micrometers or more.

22. A paint composition comprising the composition according to claim 1, wherein the paint is a high gloss paint.

23. The paint composition according to claim 22, wherein the isocyanate and the polyol form a binder.

24. The paint composition according to claim 22, having a coefficient of reflection, when applied to a metal support and after crosslinking, which is greater than 80%, for a 60° angle of incidence.

25. A composition useful for obtaining a high gloss coating, comprising:
an isocyanate which is at least partially masked by one or more masking agent, having a degree of liberation with respect to the masking agent at 120° C. of 5% (equivalent) or less and having a glass transition temperature of about 10° C. or more; and
a polyol having a glass transition temperature of about 40° C. or more, a hydroxyl number of 20 or more and an average molecular weight Mn of about 500 g/mol or more;
wherein at least one of the following conditions apply:
the composition further comprises a carboxylic acid function, with the proviso that, when the carboxylic acid function which is free or in the form of a salt, has an acid number greater than 30, the amine content is lower than 0.6% (equivalent) of the isocyanate (masked and free);
the composition is essentially free of an esterification catalyst which is solid and/or non-liposoluble;
the composition is essentially free of a matt effect wax; and
the composition further comprises a liposoluble catalyst.

26. The composition according to claim 25, wherein carbon dioxide is not given off from the composition when heated at a temperature of 180° C. for 15 minutes.

27. The composition according to claim 25, said composition being essentially free of organic bases.

28. The composition according to claim 25, said composition being essentially free of amines.

29. The composition according to claim 25, wherein a carboxylic function and an esterification catalyst are present.

30. The composition according to claim 29, wherein the esterification catalyst is liposoluble and/or non-solid.

31. The composition according to claim 25, wherein a carboxylic function is present, the isocyanate bearing the carboxylic function in the form of the product of reaction of an agent bearing a carboxylic function and a function which reacts with a free isocyanate function.

32. The composition according to claim 25, wherein a carboxylic function is present, the ratio, in equivalents, of carboxylic functions to isocyanate functions (free and masked) which have reacted with agents bearing carboxylic functions, being 5:100 or more, with the proviso the organic base content is lower than 0.6% (equivalent) of the isocyanate (masked and free).

33. The composition according to claim 32, wherein the ratio, in equivalents, of carboxylic functions to isocyanate functions (free and masked) which have reacted with agents bearing carboxylic functions, being 5:100 to 90:100.

34. The composition according to claim 25, wherein the acid number of the composition is 20 mg KOH/g or less.

35. The composition according to claim 25, wherein the polyol has a melting point of about 130° C. or less.

36. The composition according to claim 25, wherein the average molecular weight Mn of the polyol is from 1000 to 6000 g/mol.

37. The composition according to claim 25, wherein the composition is essentially free of catalyst having at least one of the following characteristics:
a low liposolubility; and
a solid form.

38. The composition according to claim 25, said composition being in the form of a powder having a particle size wherein a d90 is about 200 micrometers or less.

39. The composition according to claim 25, having a coefficient of reflection, when applied to a metal support and after crosslinking, which is greater than 80%, for a 60° angle of incidence.

40. The composition according to claim 25, wherein the isocyanate and the polyol form a binder, and the glass transition temperature of the binder is from 20° C. to 100° C.

41. The composition according to claim 25, further comprising one or more additional isocyanates at least partially masked by the one or more masking agents, wherein at least one of the isocyanates contains polymethylene chains $(CH_2)\pi$ where $\pi$ is an integer of 2 to 10 and said chains represent one third or more of the masked isocyanates.

42. The composition according to claim 41, wherein the isocyanates include hexamethylene diisocyanate and IPDI.

43. The composition according to claim 25, wherein the glass transition temperature (Tg) of the isocyanate is greater than 20° C.

44. The composition according to claim 25, wherein the glass transition temperature (Tg) of the composition is greater than 20° C.

45. A process for preparing the composition according to claim 25, comprising the steps of preblending the isocyanate, the polyol and any other components in a blender, and melting, homogenizing and dispersing the polyol and other meltable components of the blend in an extruder having one or more screws.

46. The process according to claim 45, wherein the blending temperature and the extrusion temperature are about 130° C. or less.

47. The process according to claim 45, further comprising steps of cooling followed by grinding the extrudate, the ground extrudate having a particle size wherein a d90 is about 200 micrometers or less, and a d10 is about 20 micrometers or more.

48. A paint-composition comprising the composition according to claim 25, wherein the paint is a high gloss paint.

49. The paint composition according to claim 48, wherein the isocyanate and the polyol form a binder.

50. The paint composition according to claim 48, having a coefficient of reflection, when applied to a metal support and after crosslinking, which is greater than 80%, for a 60° angle of incidence.

* * * * *